United States Patent
Pan

(10) Patent No.: US 8,464,289 B2
(45) Date of Patent: Jun. 11, 2013

(54) DELIVERING PERSONALIZED MEDIA ITEMS TO USERS OF INTERACTIVE TELEVISION AND PERSONAL MOBILE DEVICES BY USING SCROLLING TICKERS

(76) Inventor: Yang Pan, Singapore (SG)

(*) Notice: Subject to any disclaimer, the term of this patent is extended or adjusted under 35 U.S.C. 154(b) by 0 days.

(21) Appl. No.: 13/487,197

(22) Filed: Jun. 2, 2012

(65) Prior Publication Data

US 2012/0240159 A1  Sep. 20, 2012

Related U.S. Application Data

(63) Continuation-in-part of application No. 12/718,974, filed on Mar. 6, 2010, now abandoned.

(51) Int. Cl.
| | |
|---|---|
| *H04N 7/10* | (2006.01) |
| *H04N 7/16* | (2011.01) |
| *H04N 5/445* | (2011.01) |
| *H04N 7/18* | (2006.01) |

(52) U.S. Cl.
USPC ............. 725/34; 725/10; 725/12; 725/38; 725/47; 725/80

(58) Field of Classification Search
None
See application file for complete search history.

(56) References Cited

U.S. PATENT DOCUMENTS

| | | | |
|---|---|---|---|
| 6,351,270 B1 | 2/2002 | Nishikawa et al. | |
| 6,718,551 B1 | 4/2004 | Swix et al. | |
| 7,269,837 B1 | 9/2007 | Redling et al. | |
| 7,346,606 B2 | 3/2008 | Bharat | |
| 2002/0162121 A1* | 10/2002 | Mitchell | 725/135 |
| 2003/0167467 A1* | 9/2003 | Allen et al. | 725/47 |
| 2004/0078814 A1 | 4/2004 | Allen | |
| 2004/0221304 A1* | 11/2004 | Sparrell et al. | 725/34 |
| 2005/0044577 A1 | 2/2005 | Jerding et al. | |
| 2005/0154996 A1 | 7/2005 | Othmer | |
| 2007/0291747 A1 | 12/2007 | Stern et al. | |
| 2011/0271301 A1* | 11/2011 | Kennedy | 725/38 |
| 2011/0321073 A1* | 12/2011 | Yarvis et al. | 725/10 |
| 2012/0060176 A1* | 3/2012 | Chai et al. | 725/10 |

* cited by examiner

*Primary Examiner* — Chris Parry
*Assistant Examiner* — Oschta Montoya

(57) ABSTRACT

A system and method of delivering personalized media items to users of an interactive television is disclosed. The system comprises a television terminal, a computing device and a remote control device. The system stores a personal profile for each of its users. Personal mobile devices associated with the users are connected wirelessly to the computing device. Identities of the users may be transmitted from the personal mobile devices to the computing device. Media items are selected based upon the personal profiles according to a predetermined algorithm. Media items may be displayed using scrolling tickers on the television terminal. In one embodiment, a detailed content of a selected media item may be delivered either on the television terminal or on a display of one of the personal mobile device. In another embodiment, scrolling tickers may also be displayed on displays of the personal mobile devices.

20 Claims, 16 Drawing Sheets

DELIVERING PERSONALIZED MEDIA ITEMS TO USERS OF INTERACTIVE TELEVISION AND PERSONAL MOBILE DEVICES BY USING SCROLLING TICKERS

CROSS-REFERENCE TO RELATED APPLICATIONS

The present application is a Continuation-in-Part of the application Ser. No. 12/718,974.

BACKGROUND

1. Field of Invention

This invention relates generally to advertising. More specifically, the invention relates to method and system for providing advertisements by employing an interactive television system.

2. Description of Prior Art

Advertising using traditional media, such as television, radio, newspapers and magazines, is well known. Unfortunately, even when armed with demographic studies and entirely reasonable assumptions about the typical audience of various media outlets, advertisers recognize that much of their advertisement budget is simply wasted. Moreover, it is difficult to identify and eliminate such waste. The Internet, and particularly, World Wide Web (Web), has experienced tremendous growth during recent years. Advertising over more interactive media had become popular. The Web allows users to retrieve and access text, graphics, audio, video, and other information from remote servers. The Web has become a valuable source of news, educational resources, commercial information, entertainment, and the like. As for delivering commercial information to a user using the Internet, it has been found that advertisement in Web pages are most effective if they can be tailored and directed to segments of the population that are likely to be interested in advertised products and services.

One of the simplest methods of tailoring Internet advertisements to recipients is similar techniques used in television, radio and other media. In particularly, advertisements are selected to correspond to the subject matter of the Web page or other Internet resources. The U.S. Pat. No. 7,346,606 to Bharat disclosed an art for rendering advertisements to a user by monitoring user behavior and determining the user's topic of interest when the user is assessing the Internet through browsing Web pages.

Furthermore, mobile communication devices have gained significant popularity in recent years. Users are using the mobile device such as, for example, iPhone from Apple Inc, Cupertino, Calif., to assess the Internet services. Innovative methods for delivering advertisements to users by employing mobile communication devices have been developed.

Among all electronic devices, television is still one of the most popular devices used by various users. Advertisements delivered to viewers through the television are typically broadcast to the viewers without differentiation, which makes the advertisements less effective. In recent years, there is a trend that television program is delivered by using of communication network rather than more conventional means such as by broadcast and cables. Internet Protocol Television (IPTV) is a system where a digital television service is delivered using Internet Protocol over a network infrastructure such as for example, over a broadband connection. A general definition of IPTV is television content is received by a user through the technologies used for computer networks instead of being delivered through conventional means. More particularly, in IPTV, television programming is delivered as video contents, which is divided into data packets and streamed to consumers over the Internet. The IPTV stream of data packets is received by a set top box, which is connected to a subscriber's television. Typically, the set top box is connected to the Internet over a broadband connection.

IPTV provides greater control and flexibility to consumers than traditional TV distribution technologies. For example, because television programming is delivered point-to-point from a provider to a subscriber, a user may individually control programming being delivered. Also, because television programming is being delivered over the Internet, a user may receive IPTV program from around the world.

In various other digital television delivery systems, such as digital cable and satellite, digital data streams are delivered to a set top box which is connected to a television. These digital television delivery systems can provide various levels of control and flexibility to users.

IPTV and other digital television delivery systems offer greater control to service provider than traditional TV distribution technologies. Service providers can then provide personalized TV advertising. That is, service providers can target specific users or groups of users with customized advertisements based on viewing or purchasing habits of the users. The U.S. Pat. No. 6,463,595 to Hendricks et al disclosed a system to deliver targeted advertisements to different groups of viewers during the commercial breaks to improve the effectiveness of the advertisements. In the U.S. Pat. No. 6,718,551 to Swix et al, a method is disclosed for providing targeted advertisements to a user based upon tracking and storing and analyzing the viewer's selections. In the US patent application 2007/0291747 by Stern et al, a method is disclosed for user to user targeted advertising using a digital television delivery service. In the U.S. Pat. No. 7,269,837 to Redling et al., an art is disclosed for providing advertisement from a central database server connected to a global computer network to distributed sites via interactive television. A representative icon is presented to a subscriber on a television indicating an advertisement. When the icon is selected, advertisement information details are retrieved from storage in a local memory or from the server and presented to the user. In US patent application 2006/0031405 by Goldman et al, an art is disclosed for selecting and inserting advertisements in an information documents displayed to a user, wherein the selection is based at least in part on television programming viewed by the user.

The tickers of television have been used to deliver real time stock price and headlines of the news. In US patent application 2003/0167467 by Allen et al. The ticker for an interactive television system has user-customizable features including a feature to exclude ticker topics dynamically from the display screen while the ticker is being presented.

All above mentioned prior arts have attempted to deliver targeted advertisements to a user by leveraging programmability of the interactive television. It should be noted that television is a home appliance and is typically shared by multiple family members, who may have different topic of interest. Therefore, it is desirable that the interactive television system including the television terminal, a set top box and a remote control can be used to determine the identity of a user and can deliver the targeted advertisement messages accordingly.

SUMMARY OF THE INVENTION

It is an object of the present invention to provide a method of rendering a media item including a targeted advertisement message to a user by employing an interactive television system.

It is another object of the present invention to provide a method of using the remote control device or the interactive television system to determine the identity of a user of the system.

It is yet another object of the present invention to provide a method of delivering media items in a hierarchical manner to a user of the interactive television system by employ scrolling tickers.

It is a further object of the present invention to provide a method of delivering targeted media items to multiple users of the interactive television system.

It is still a further object of the present invention to provide a method of delivering media items by using a personal mobile device connected to the interactive television system.

The present invention provides system and method of rendering a targeted advertisement message to a user of an interactive television system connected to an advertising server via the Internet through a computing device such as a set top box.

According to one embodiment of the present invention, the system is based upon the IPTV. An advertising server operated by an advertisement broker may be connected to a computing device of the system through a communication network. The broker receives advertisement messages from various advertisers.

The exemplary IPTV system comprises a computing device, a television terminal and a remote control device. The computing device comprises typically a set top box, which connects the television terminal and the server via a communication network. The communication network may be the Internet according to one implementation of the present invention. After the user switches on the television terminal, the user's identity may be determined. According to one implementation of the present invention, a list of icons representing each of existing users of the system may be displayed. The user may make a selection using the remote control device. According to another implementation, the remote control device may comprise a sensory unit. The sensory unit may comprise biometric sensors. The sensory unit may further include digital cameras for capturing the user's facial images. The sensory unit may also include fingerprint sensors for capturing the user's fingerprint images. The user's identity can be determined by analyzing the collected biometric traits.

The sensory unit may even include a voice recording device that determines the user's identity by analyzing the recorded voice of the user.

The computing device may comprise a storage unit storing a personal profile for each user of the system. A media item database for each user may be established based upon the user's personal profile. The database may be updated on a regular base by receiving updated data from the server. Media items including advertisement messages, news and stock prices may be delivered and displayed as scrolling tickers. One of the scrolling tickers may be selected by the user employing the remote control device. The next level of detailed messages may be displayed after the ticker is selected. The detailed message may be a video program that is presented using an enlarged display space or even the full display screen of the television terminal.

The media items may be organized by media categories in a hierarchical manner with multiple levels. The user may select a media item to view a detailed content progressively through a hierarchical user interface using the scrolling tickers.

One or more users of the IPTV may carry a personal mobile device. The personal mobile devices may be connected to the computing device of the IPTV through ad hoc communication links such as, for example, through a Bluetooth type of connection. The user's identity may be stored in a file storage system of the mobile device. The identity may be transmitted to the computing device through the communication link. When multiple users are identified, media items may be selected based upon a predetermined algorithm that includes but is not limited to 1) finding common media categories that the users are interested in; and 2) selecting media items based upon a predetermined weight for each of the users.

The detailed content of the selected media item may be delivered using a display of the personal mobile device. When multiple users are involved, user selectable devices may be displayed after a scrolling ticker is selected. The user may select a device to deliver the detailed content of the media item.

In another implementation, scrolling tickers may be displayed on one or more displays of the personal mobile devices in addition to be displayed on the television terminal. A user may select a scrolling ticker using the mobile personal device to deliver the detailed content of the media item.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

Figure 1:
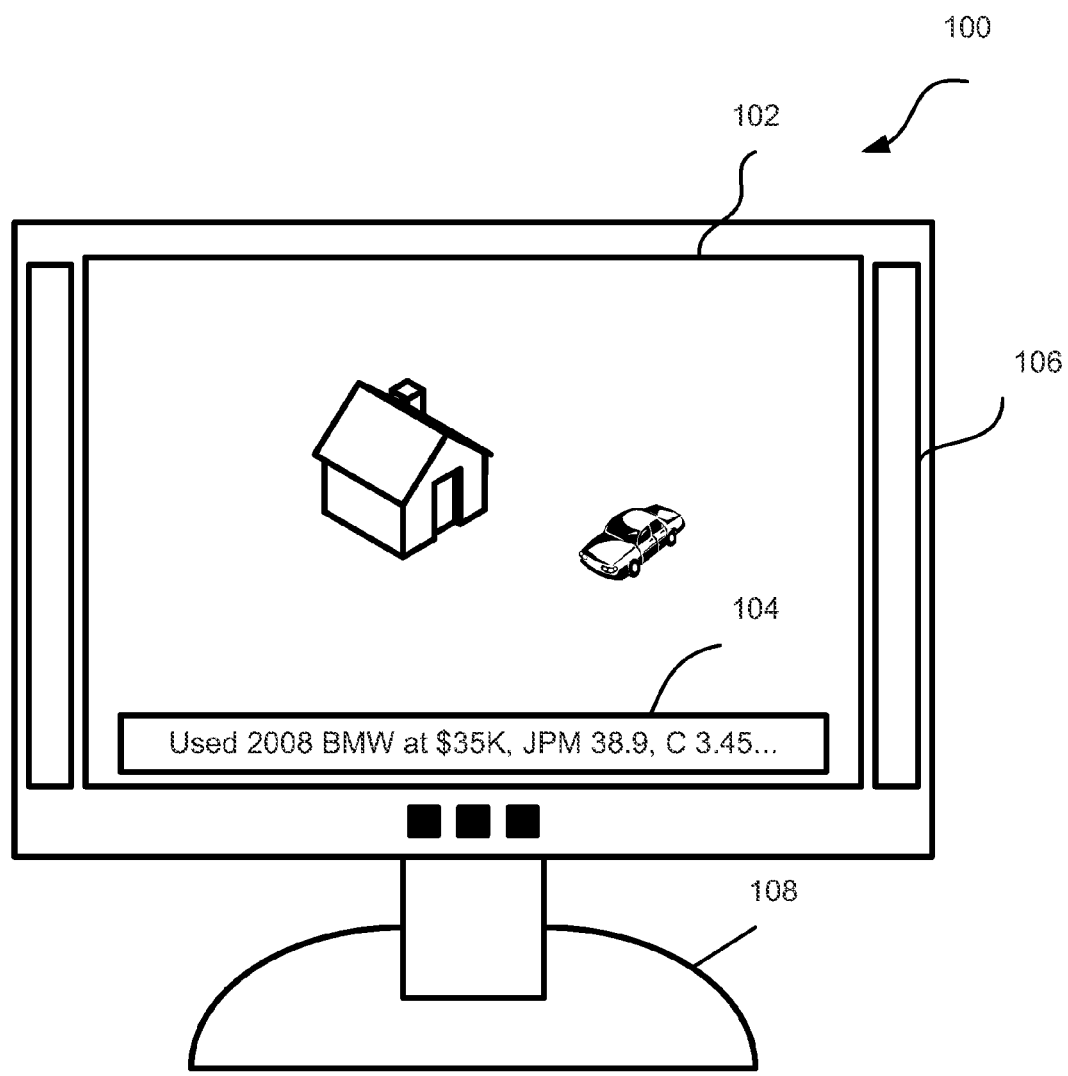
FIG. 1 is a schematic diagram of a television terminal of an IPTV system illustrating exemplarily that media items are displayed as scrolling tickers.

References will now be made in details to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

It is relatively common to see television programs accompanied by a scrolling "ticker". The term "ticker" derives from the fact that information in the ticker scrolls sequentially across the bottom of a television screen in a manner analogues to a stock market ticker tape. However, instead of simply including stock market information, current tickers carry a wide variety of other types of information. For instance, tickers that are present on sports channels typically scroll game scores or game schedules. Tickers that present on news channels scroll the latest headlines, weather report, or brief news updates.

Tickers are generally encoded in the same analog or digital signal as the television signal. For instance, with MPEG (Motion Pictures Experts Group) digital encoding, the ticker information is included along with the MPEG stream. A graphics generator or other mechanism generates the ticker information at a production studio (or other location) and then combines the ticker information with the television signal. The television signal is then broadcast to users of the television systems. Obviously, with this current implementation, users have no control over the content, format, layout, or other presentation aspect of the ticker on their television (including whether or not even display the ticker), since the production studio maintains such control and since the ticker information is integrated with the received television signal.

Conventional tickers generally are not tailored to any particular user. They are broadcast to all users of the television systems and are not intended to target any particular market or viewer segment. As a result, broadcasters are forced to include content in tickers that are only of a general nature, or if they want to provide more details and topics in the tickers, they are forced to increase the quantity of information scrolled in tickers so that they can ensure some level of specificity for each ticker topic.

The present invention is based upon an IPTV to provide a means of delivering targeted media items to a user. The IPTV is used in an exemplary manner only. The inventive concept can be extended to other type of digital TVs.

The present invention uses in an exemplary manner that tickers are scrolled from right to left at the bottom of the television terminal. The tickers could move in any direction such as, for example, from top to bottom or from bottom to top or could be displayed on any position of the television terminal. In some embodiments of the present invention, the tickers could be displayed at any predetermined position of a display of a personal mobile device.

A schematic diagram of a television terminal is shown in FIG. 1 in an exemplary manner. The display terminal 100 comprises a display screen 102. The display screen 102 may comprise a LCD (Liquid Crystal Display) screen. The display screen 102 may also comprise other type of displays such as a PDP (Plasma Display Panel). A television program is broadcasted to a user after the user selects a channel. A plurality of scrolling tickers 104 are displayed at the bottom of the display screen 102. The tickers are scrolled sequentially across the screen. The tickers deliver media items such as a text message for an advertisement, a stock price and a headline of news. The display terminal may also include a speaker system 106 and a support mechanism 108 for the terminal. The invention is characterized by that the displayed contents of the tickers are based on the user's personal profile. The contents are programmed to tailor the specific user's needs. The computing device of the IPTV system may comprise a software program to place a plurality of tickers to a broadcast program selected by the user. The programmability is a unique nature of an interactive television system. The computing device may be a set top box according to the preferred embodiment of the present invention. The computing device may also be a set top box connected to a personal computer according to another embodiment.

Figure 2:
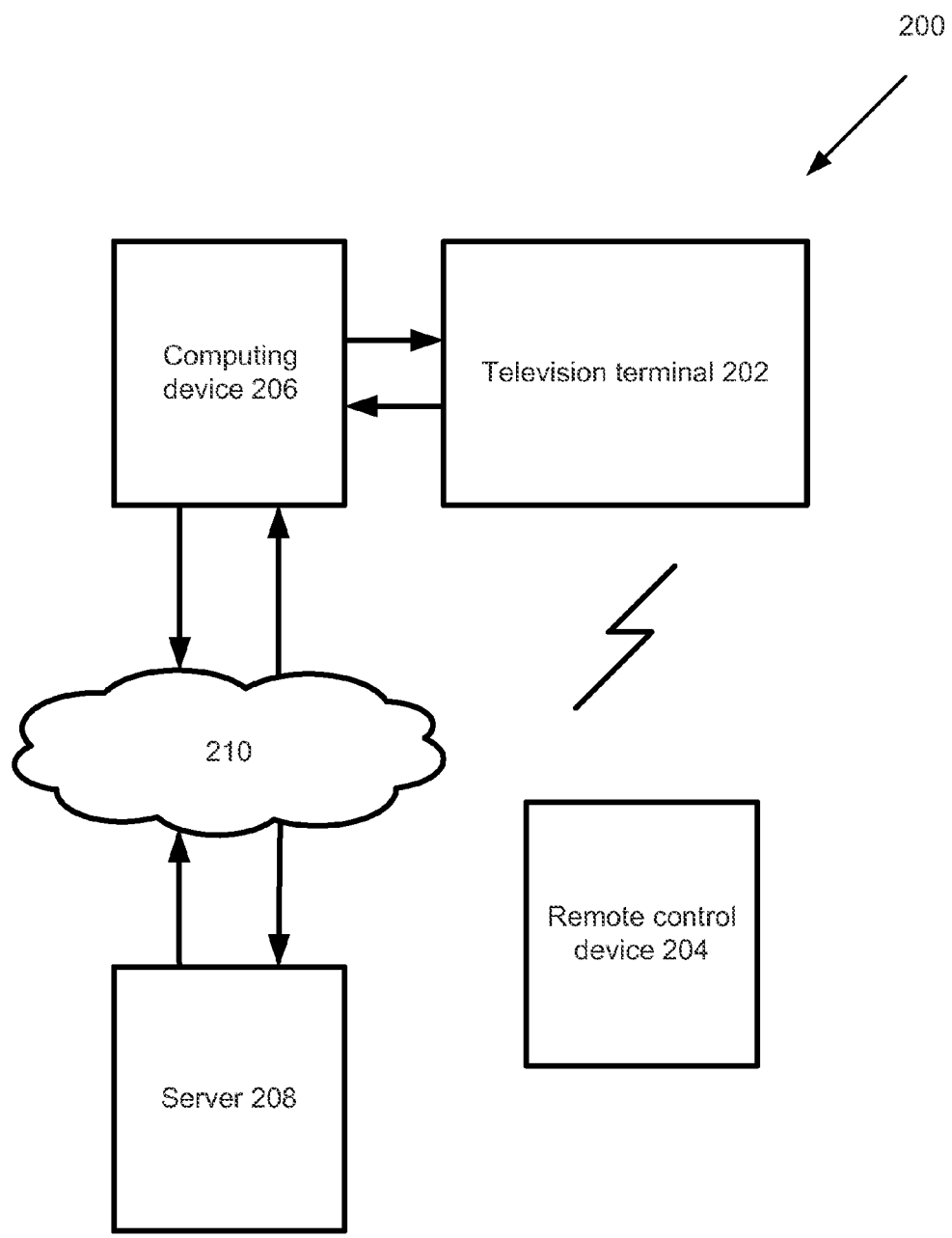
FIG. 2 is a schematic diagram of an exemplary IPTV system comprising a television terminal, a remote control device and a computing device connecting to a server through a communication network.

FIG. 2 is a schematic diagram of an exemplary implementation of the system based upon an IPTV. The system 200 comprises a television terminal 202 and a remote control device 204. A computing device 206 is connected to the terminal 202. The remote control device 204 may send a signal in a wireless manner to the television terminal 202 after receiving a user's input. The communication means between the remote control device and the television terminal is well established in the prior art. The computing device 206 may be a set top box according to one implementation of the present invention. A set top box is a device that connects to a television terminal and an external source of signal, turning the signal into content which is then displayed on the television screen. The set top box may comprise a processor, a storage unit and communication units for connecting to the television terminal 202 and also to a server 208 through a communication network 210. The communication network 210 comprises the Internet according to one implementation of the present invention.

The IPTV system may have one or more users. In one implementation, each of the users will have a personal profile stored in the storage unit of computing device 206. A media item library may also be stored in the storage unit. The media items in the library may be determined by the personal profiles of the users. The media items may be updated regularly or be updated when each time a user's personal profile is changed. In another implementation, the media item library may be stored in the network or "cloud". The media items can be transferred to the IPTV system in real time base through a broadband connection. A user may access his or her media items in a library through any interactive television system in any place that has a connection to the network or "cloud".

According to another implementation of the present invention, the computing device may further comprise a personal computer connected to the set top box. The personal computer may be connected to the set top box wirelessly through an ad hoc communication link.

The server 208 may be operated by an advertisement broker to deliver updated advertisement messages to the computing device 206 and subsequently to the television terminal 202. The server 208 may be connected to many advertisers. The server 208 may also include a database or a number of databases for other media items such as television programs, news, and stock prices.

Figure 3:
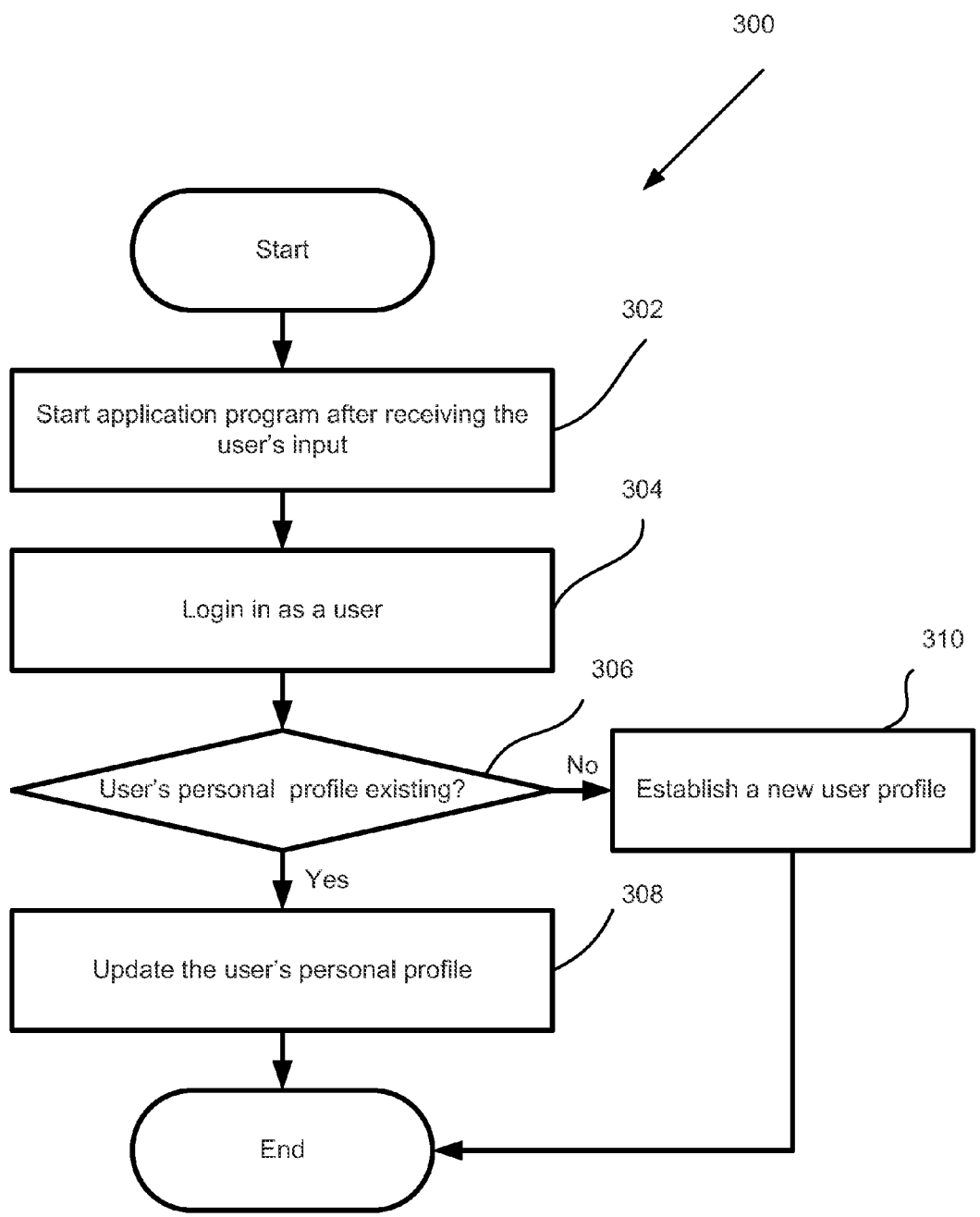
FIG. 3 is a flowchart illustrating an exemplary process that a user employs a personal computer connected to the set top box to establish or to update his or her personal profile.

FIG. 3 is a flowchart illustrating an exemplary process that a user of system 200 employs a personal computer connected to the set top box to establish or to update his or her personal profile. The process 300 starts with step 302 that an application program is started after receiving the user's input through an input device of the personal computer. The user then logins in as a user of the program in step 304. The user may be an existing user or a new user. The existing user has a personal profile stored in a storage unit in the personal computer or in the set top box. If a personal profile for the user is found in step 306, the personal profile is then updated in step 308. Step 308 is optional. The user may choose not to update the personal profile. Otherwise, a personal profile for the new user is established in step 310. The personal profile may include the user's interests for specific segments of the advertisement messages. It may also include a list of stocks that the user is tracking. It may further include specific groups of news that the user is interested in.

It should be noted that the user may also select control parameters that the scrolling tickers are to be displayed including the location of the tickers and the speed of tickers to be scrolled. The user may also decide to display only one type of or several types of media items by the tickers. The user may also decide not to display any ticker.

Figure 4:
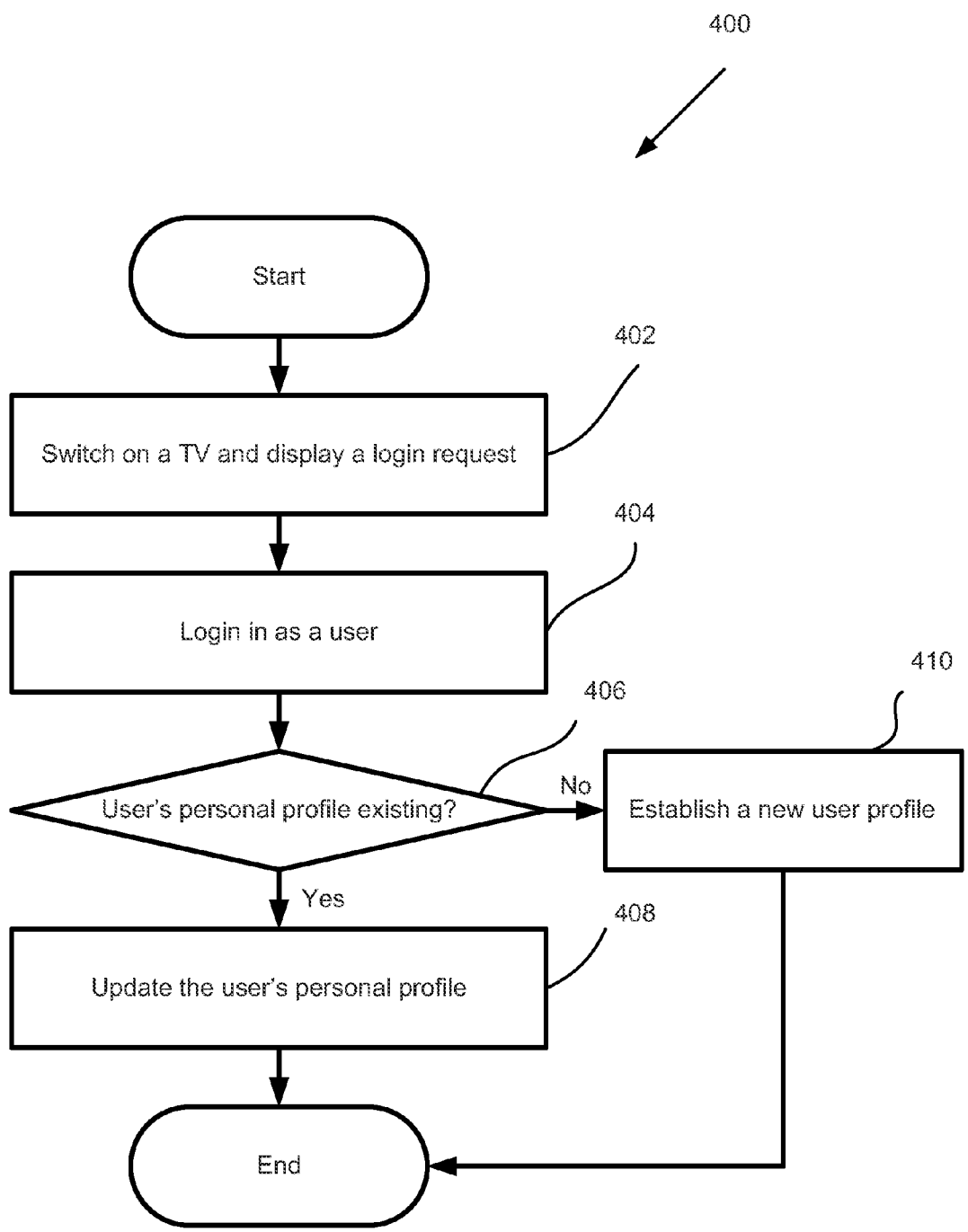
FIG. 4 is a flowchart illustrating an exemplary process that a user employs a television terminal and the remote control to establish or to update his or her personal profile.

FIG. 4 is a flowchart illustrating an exemplary process that a user of the system 200 employs a television terminal and a remote control device to establish or to update his or her personal profile. Process 400 starts with step 402 that the television terminal is switched on. The user may use the remote control device 204 to start an application program by displaying a list of icons representing each of existing users. The program may also display an icon for a new user. The operation of the application program may be controlled by the computing device 206 according to one implementation of the present invention. In step 404, the user may select one of the icons representing an existing user as his or her identity by using the remote control device 204. The user may also decide to select an icon representing a new user as his or her identity. If the user's personal profile is found in step 406, the user may update the profile in step 408. Step 408 is optional. The user may choose not to update the profile. Otherwise, a new personal profile is established for the new user in step 410. The personal profile may have a plurality of user selectable items defining the user's preference for media items to be displayed by the scrolling tickers.

Figure 5:
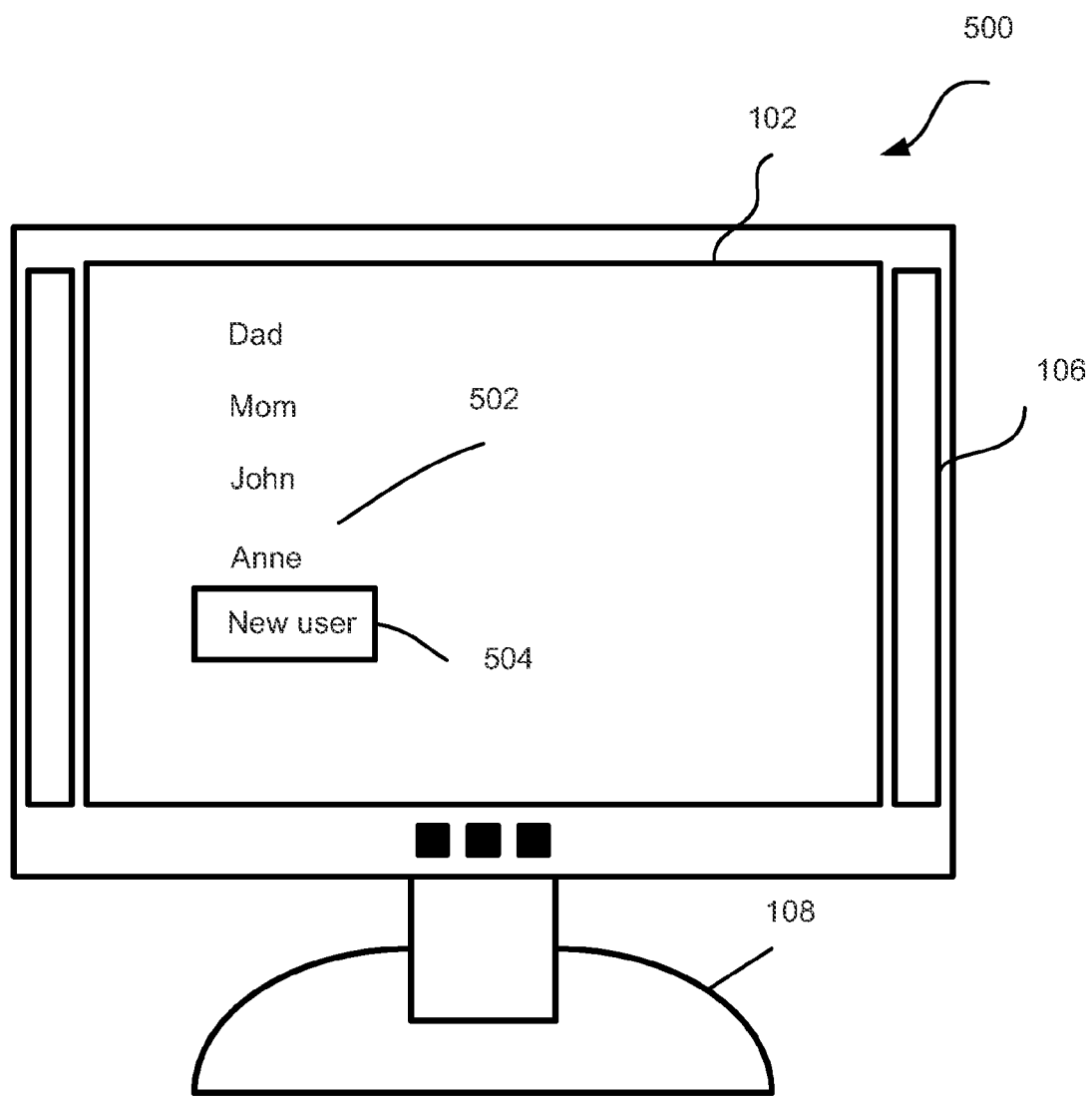
FIG. 5 is a schematic diagram illustrating exemplarily that a list of icons representing each of existing users and also a new user is displayed on the television terminal.

FIG. 5 is a schematic diagram illustrating that a list of icons 502 representing each of existing users and also a new user is displayed on the television terminal 500. The user may select one of the icons to represent his or her identity. The user may employ the remote control device 204 to move an optical symbol 504 to make the selection. After the user's identity is determined, targeted media items such as the targeted advertisement messages may be displayed using the scrolling tickers.

Figure 6:
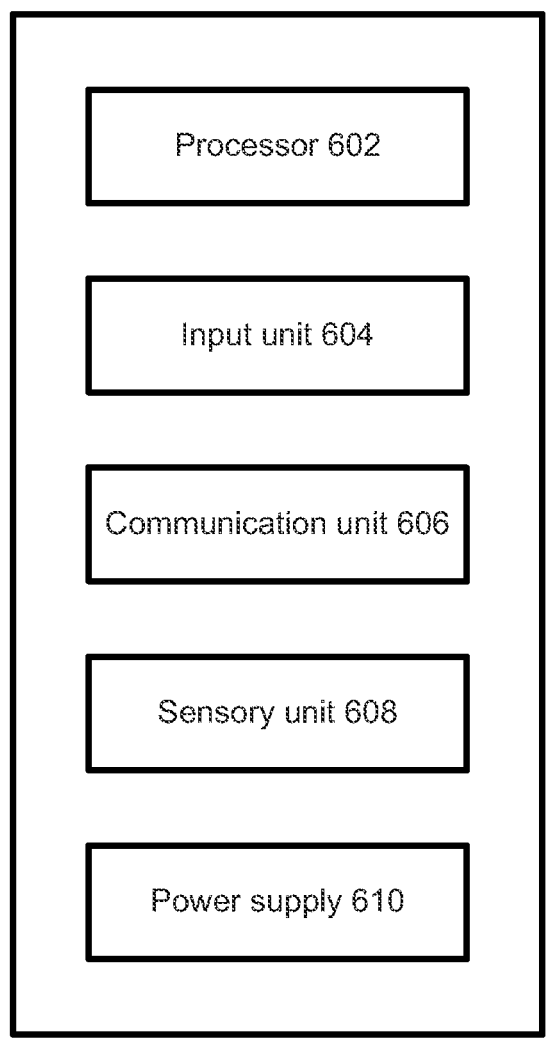
FIG. 6 is a schematic diagram illustrating an exemplary remote control device including a sensory unit.

FIG. 6 is a schematic diagram illustrating an exemplary remote control device 600. The remote control device 600 comprises a processor 602 which may be a microprocessor that controls operations of the device. Remote control device 600 may further comprise an input device 604 for receiving the user's inputs. Input device 604 may include buttons and touchpad. Input device 604 may also include a small LCD screen. A communication unit 606 may provide a means for remote control device 600 to communicate wirelessly with the television terminal. Communication unit 606 may be an infrared communication unit as well know in the prior art. Communication unit 606 may also be a short range communication transceiver such as a Bluetooth, a ZigBee or a Wi-Fi transceiver. Remote control device 600 further comprises a sensory unit 608 according to one embodiment of the present invention. Sensory unit 608 is used to determine to the user's identity by collecting his or her biometric traits. Sensory unit 608 may be one or multiple image sensors. When a user is using remote control device 600, the image sensors may take facial images of the user. The user's identity may be determined by comparing the collected images to a set of pre-stored images of the existing users. The image may be sent to the computing device to determine the user's identity according to one implementation of the present invention. The sensory unit 608 may further comprise one or multiple fingerprint sensors. The user's identity may be determined by the fingerprint sensors as known in the prior art. Sensory unit 608 may also comprise a voice recording device. The user may input a voice signal to remote control device 600. The received signal may be sent to the computing device. The received signal may be compared to a set of pre-stored samples for each of existing users to determine the user's identity. Sensory unit 608 may comprise more than one type of sensors to determine the user's identity. The remote control device is powered by a power supply 610 that is a battery according to one implementation of the present invention.

Figure 7:
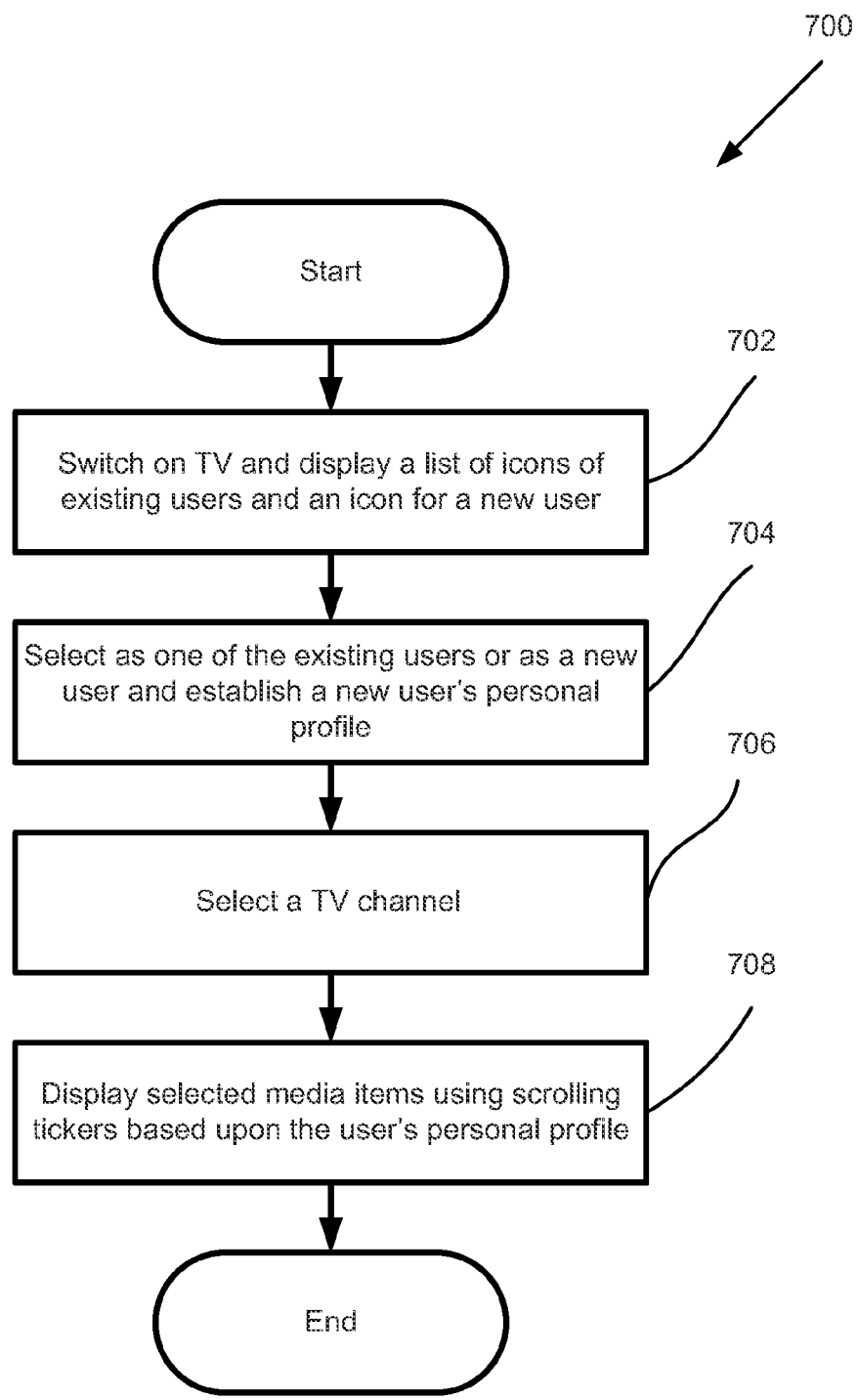
FIG. 7 is a flowchart illustrating an exemplary process that a media item including an advertisement message in text form is determined based upon the user's personal profile and is displayed as a scrolling ticker.

FIG. 7 is a flowchart illustrating an exemplary process that a media item including an advertisement message in a text form is determined based upon the user's personal profile and is displayed as a scrolling ticker. Process 700 starts with step 702 that the television terminal 202 is switched on. A list of icons for each of the existing users and for at least one new user is displayed. In step 704, the user either selects to be one of the existing users or as a new user. If the user is a new user, a personal profile is established. If the user is an existing user, he or she may decide to update the personal profile or leave the profile unchanged. In step 706, the user selects a TV channel. A TV program is then broadcasted to the user. The media items are displayed using the scrolling tickers in step 708 based upon the user's personal profile. The scrolling tickers may be placed at the bottom of the TV display screen.

Figure 8:
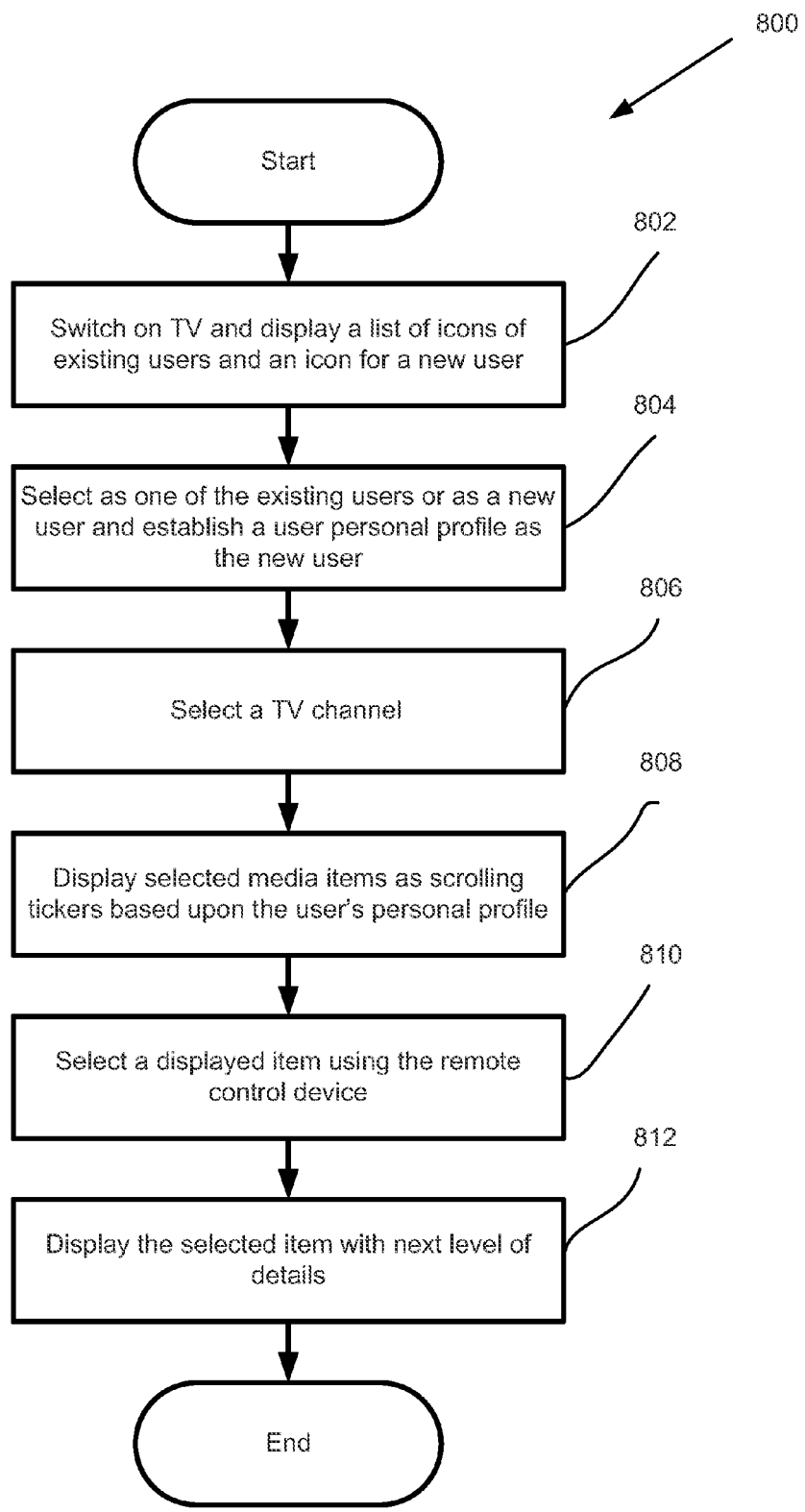
FIG. 8 is a flowchart illustrating an exemplary process that a media item is displayed in a text form as a scrolling ticker and the detailed message is presented after a ticker is selected.

FIG. 8 is a flowchart illustrating an exemplary process that a media item is presented in a two-level hierarchical manner. A text message is displayed as a scrolling ticker at the first step and a detailed message is presented at the second step after the ticker is selected. Process 800 starts with step 802 that the television terminal 202 is switched on. A list of icons representing each of the existing users and a new user is then displayed. In step 804, the user either selects to be one of the existing users or as the new user. If the user is selected as the new user, a personal profile is established. If the user is selected as an existing user, he or she may decide to update the personal profile or to leave the profile unchanged. In step 806, the user selects a TV channel. A TV program is then broadcasted to the user. The media items are displayed in step 808 based upon the user's personal profile. One of the tickers may be selected by the user employing remote control device 204 in step 810. The user may utilize the remote control device to select one of the tickers using an optical symbol. The user may actuate the selection by press a button of remote control device 204. The media items may be structured with two levels: the first level is a brief text message suitable for displaying as a ticker. The second level may be a more detailed presentation of the media item. The second level may be a video program. In step 812, a more detailed presentation of the media item is displayed. After viewing the media item, the user may use the remote control device 204 to switch the screen back to the selected channel.

Figure 9:
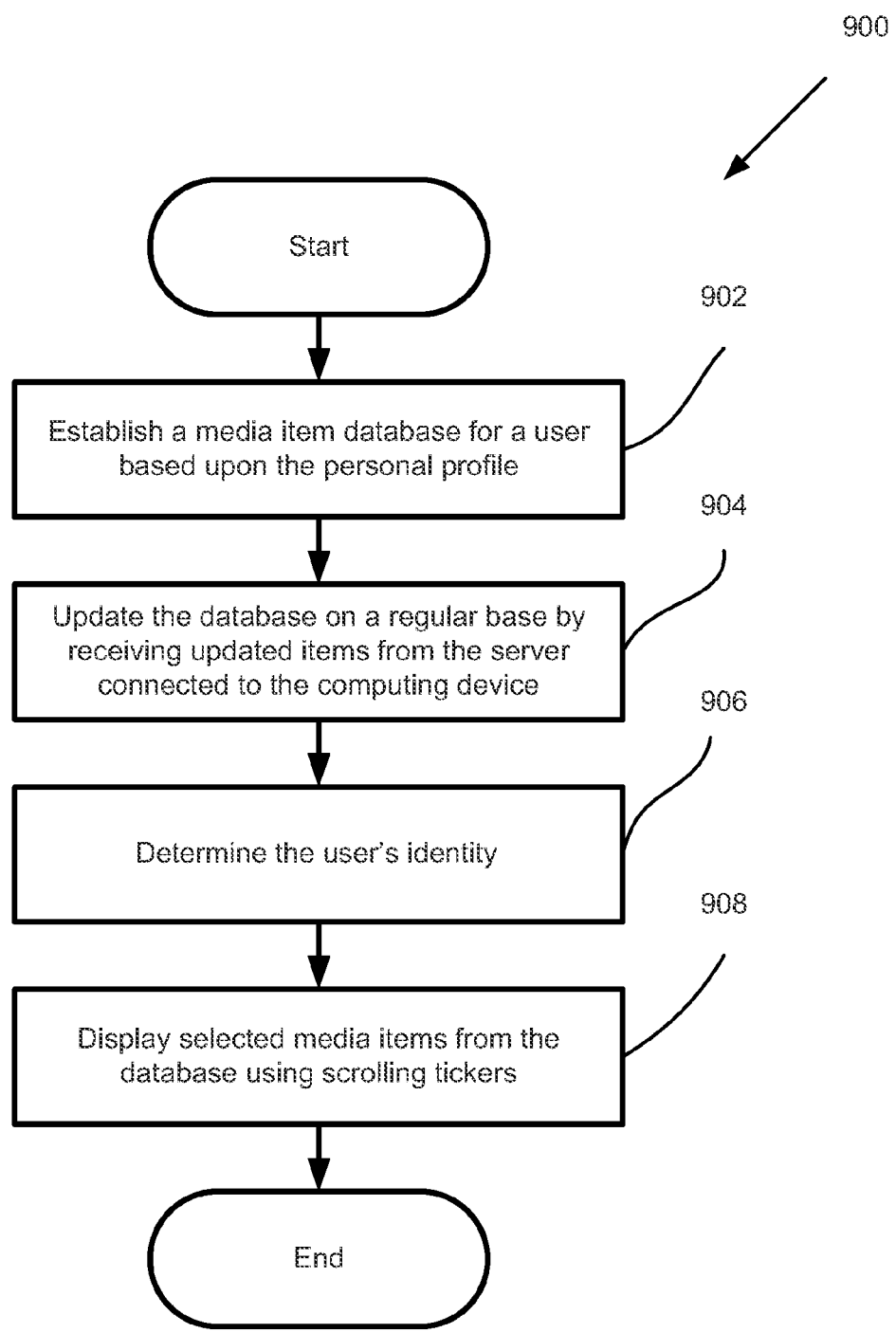
FIG. 9 is a flowchart illustrating an exemplary process that a user specific media item database is established or is updated based upon the user's personal profile.

FIG. 9 is a flowchart illustrating an exemplary process that a user specific media item database is established and is updated based upon the user's personal profile. Process 900 starts with step 902 that a media item database is established based upon a user's personal profile. The media item may include advertisement messages, the selected stock symbols and segments of news that the user is interested in. The database may be updated on a regular base in step 904 by receiving the updates from the server 208. The frequency of update for different media items may be different. The stock price may be updated in a real time manner. The headlines of news may be updated as they are available. The advertisement messages may be updated in a frequency determined by the advertisement broker operating the server 208. In step 906, the user's identity is determined. In step 908, a personalized media item is displayed using a scrolling ticker. The stored messages or media items may be displayed using the tickers in a sequential manner.

Figure 10:
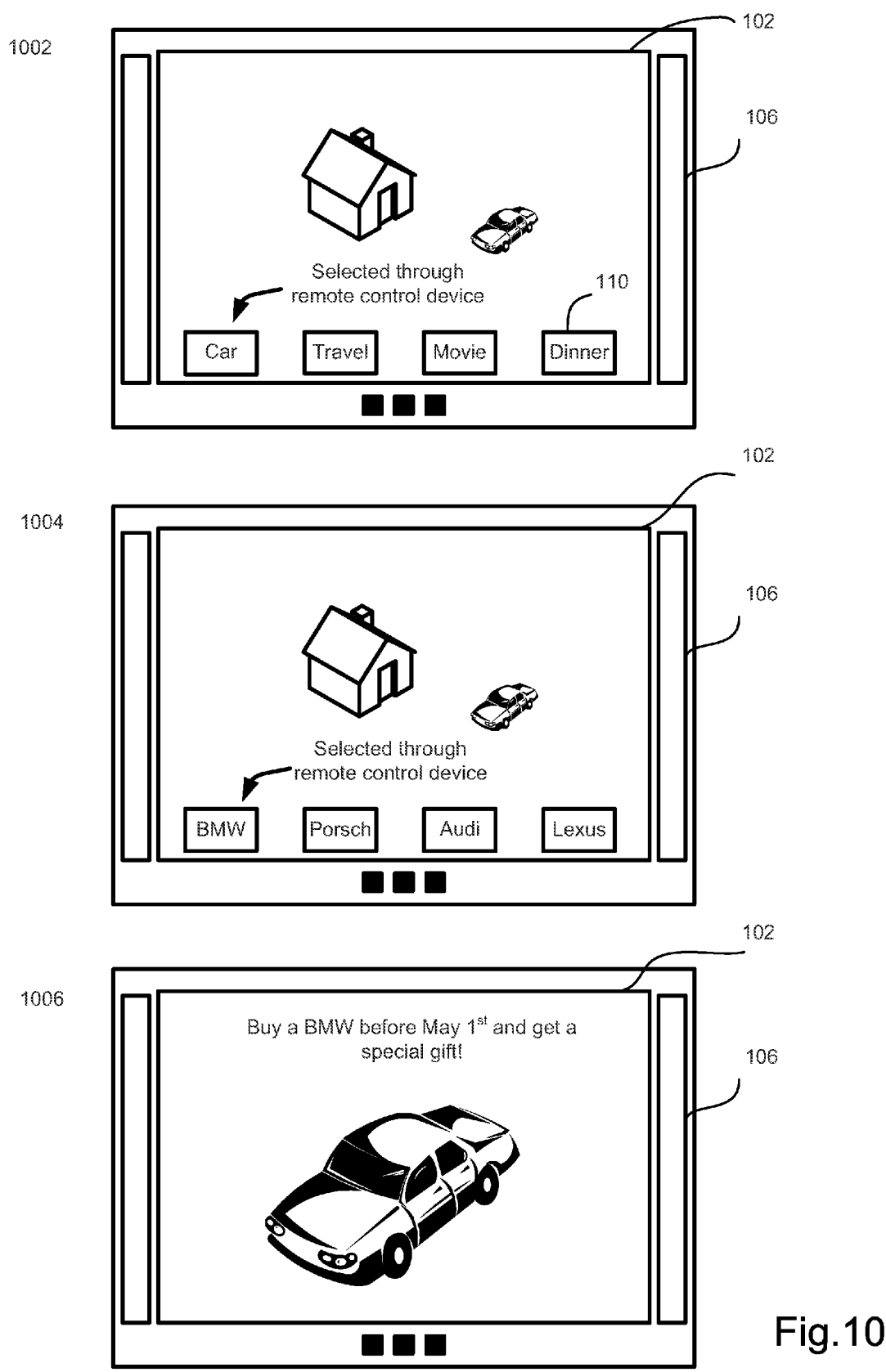
FIG. 10 is a schematic diagram illustrating exemplarily that a media item is delivered to a user using scrolling tickers through a hierarchical user interface.

FIG. 10 is a schematic diagram illustrating a media item is delivered to a user using scrolling tickers through a hierarchical user interface. Media items may be organized by media categories in a hierarchical manner. According to one embodiment of the present invention, media categories are displayed using the scrolling ticker (110) as shown in 1002. Each of the tickers may represent one media category. A user may select one of the tickers representing a media category using remote control device 204. Upon the selection, the next level of media category is shown in 1004. In an exemplary case as shown in the figure, when the ticker representing a media category: "car" is selected by the user using remote control device 204, multiple car brands are displayed using a new set of scrolling tickers that replace the old ones on the television terminal. The user may make a further selection through remote control device 204. In the exemplary case, when the brand "BMW" is selected, an advertisement about "BMW" is displayed on the television terminal as shown in 1006. In one implementation, the media item such as the advertisement may be an image. In another implementation, the media item may be a video program. The media item may be delivered using a pop-up window. The media item may also replace the TV program being broadcasted and be delivered using a full display screen of the television terminal.

Figure 11:
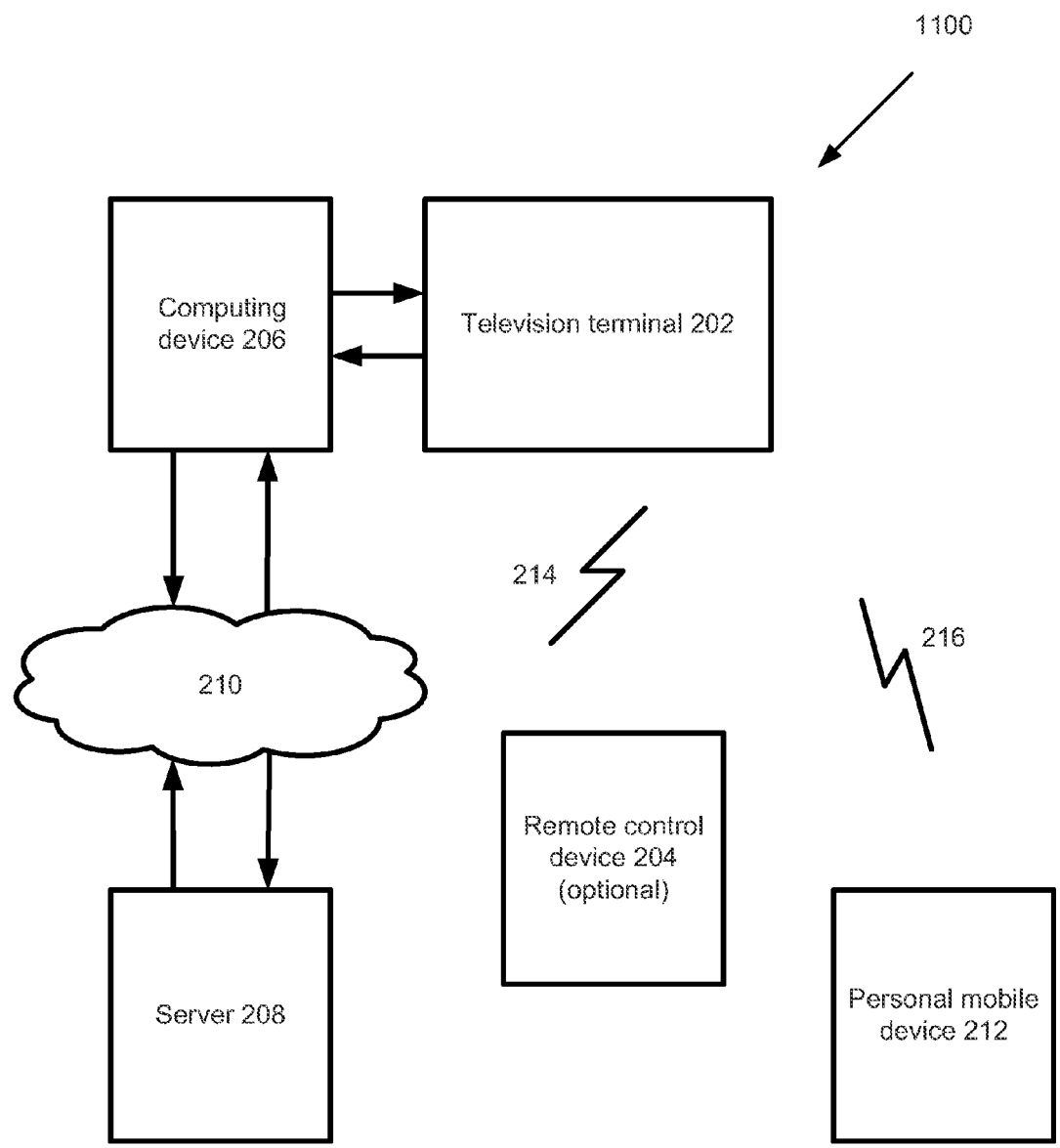
FIG. 11 is a schematic diagram of an exemplary IPTV system comprising a television terminal, a remote control device and a computing device connecting to a server through a communication network. A personal mobile device is connected wirelessly to the system.

FIG. 11 is a schematic diagram of another embodiment of the present invention. IPTV system 1100 includes a television terminal 202, a remote control device 204 as an option and a computing device 206 connecting to a server 208 through a communication network 210. Personal mobile device 212 associated with a user of the system is a mobile computing and communication device. Personal mobile device 212 may be a tablet computer such as, for example, an iPad from Apple Inc. Personal mobile device 212 may also be a mobile phone such as, for example, a iPhone from Apple Inc. Personal mobile device 212 may further be a personal media player such as, for example, an iPod from Apple Inc. In one implementation, personal mobile device 212 may be used as a remote control device. The requirement of remote control device 204 can then be eliminated.

Personal mobile device 212 further includes a communication unit (not shown in FIG. 11). A wireless communication link 216 is established between personal mobile device 212 and the IPTV system. In one implementation, personal mobile device 212 is connected wirelessly to the computing device 206. In another implementation, personal mobile device 212 is connected wirelessly to television terminal 202. In yet another implementation, personal mobile device 212 is connected wirelessly to remote control device 204. Personal mobile device 212 is connected to the IPTV system only after the device is within a predetermined distance detectable by a communication interfacing device in the IPTV system. Communication link 216 may be an ad hoc communication link. The ad hoc communication link includes but is not limited to 1) a Bluetooth type of connection; 2) a Wi-Fi type of connection; 3) a ZigBee type of connection; and 4) an optical connection.

In one implementation, the identity of the user of personal mobile device 212 is stored in a file storage system of the personal mobile device. After personal device 212 is connected to the IPTV system through the communication link 216, the identity of the user is transmitted to computing device 206. After the user is identified by computing device 206, media items are selected from media items stored in computing device 206 in accordance with the user's identity and the personal file of the user. The selected media items may be displayed using the scrolling tickers on the television terminal 202.

The media items may be transferred from server 208 through the communication network 210. The media items may even be transferred from personal mobile device 212 through the communication link 216.

Figure 12:
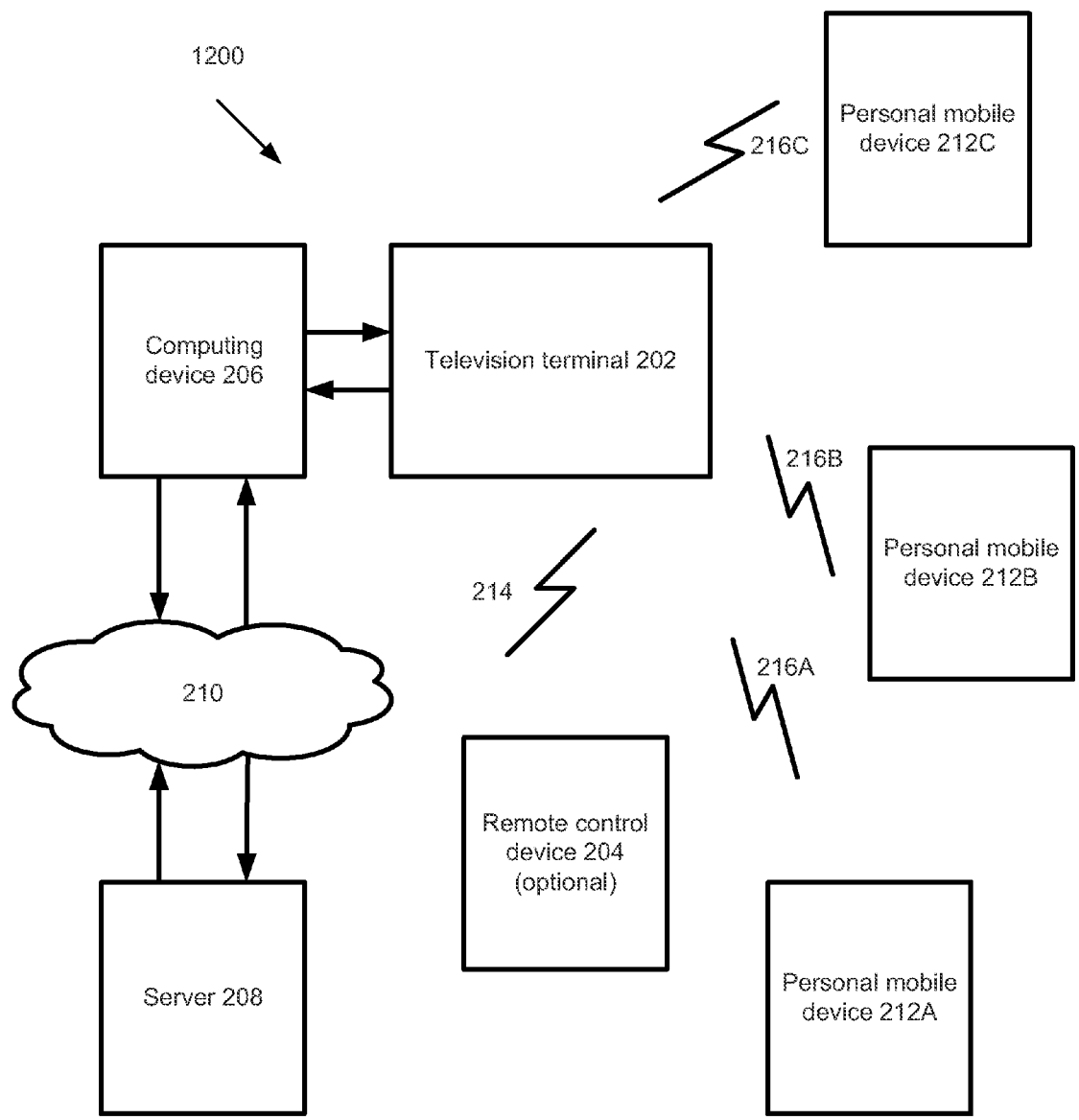
FIG. 12 is a schematic diagram of an exemplary IPTV system comprising a television terminal, a remote control device and a computing device connecting to a server through a communication network. Multiple personal communication devices associated with multiple users are connected wirelessly to the system.

In accordance with another embodiment of the present invention, multiple users may share the same IPTV system. Each of the users may carry a personal mobile device. FIG. 12 is a schematic diagram of an IPTV system 1200 comprising a television terminal 202, a remote control device 204 as an option and a computing device 206 connecting to a server 208 through a communication network 210. Multiple personal mobile devices (212A-C) are wirelessly connected to the IPTV system. Each of the personal mobile devices is connected to the computing device 206 through a wireless communication link (216A, 216B or 216C). After the communication links are established, identities of the users are sent to the computing device 204 through the communication links.

Figure 13:
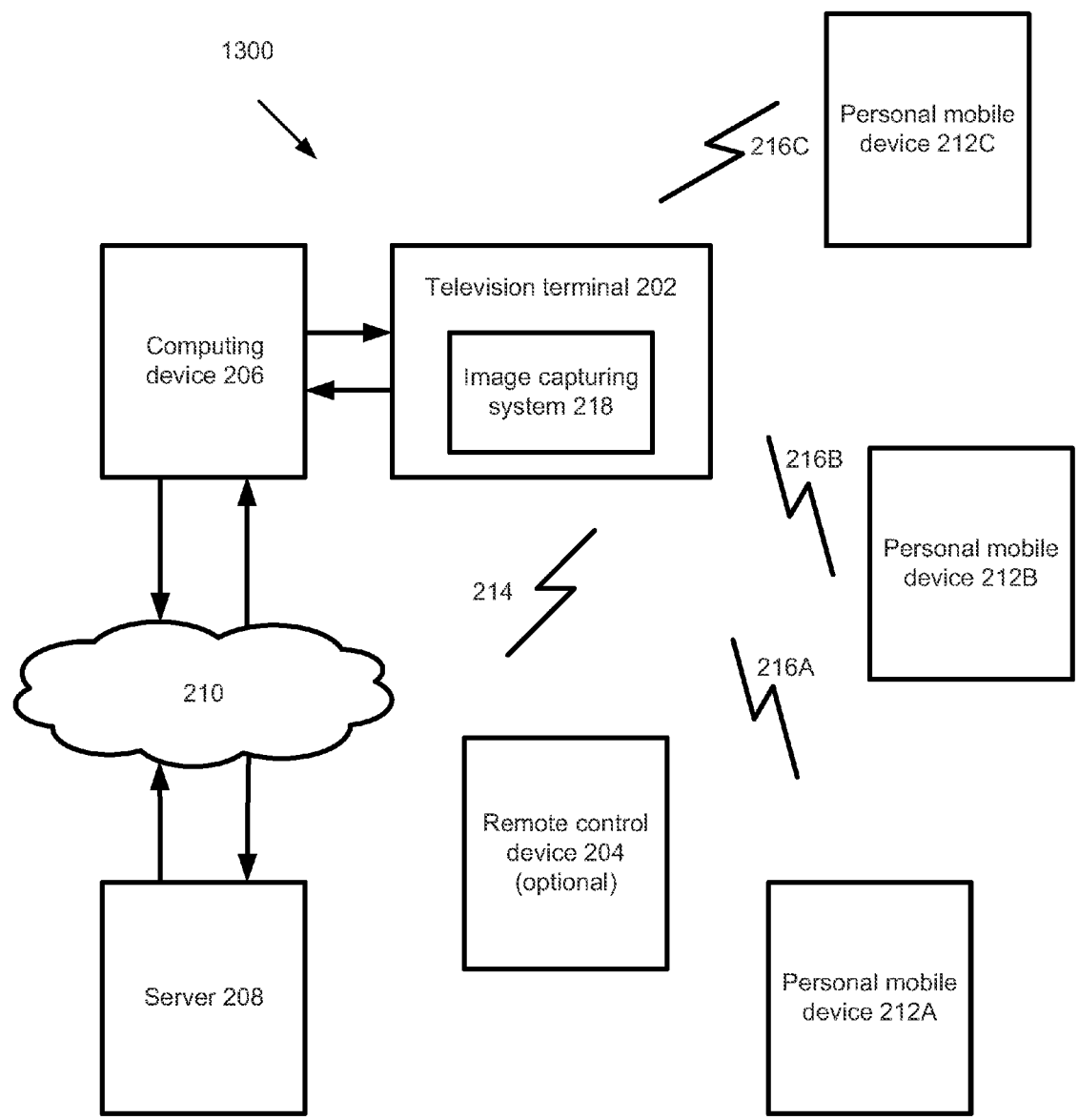
FIG. 13 is a schematic diagram of an exemplary IPTV system comprising a television terminal including an image capturing system, a remote control device and a computing device connecting to a server through a communication network. Multiple personal communication devices associated with multiple users are connected wirelessly to the system.

In accordance with another embodiment as shown in FIG. 13, an image capturing system 218 is used to identify the users. Image capturing system 218 may be installed on the television terminal 202. Image capturing system 218 may also be installed on the computing device 206. Image capturing system 218 may even be installed on remote control device 204 or on anyone of the personal mobile devices (212A-C).

Figure 14:
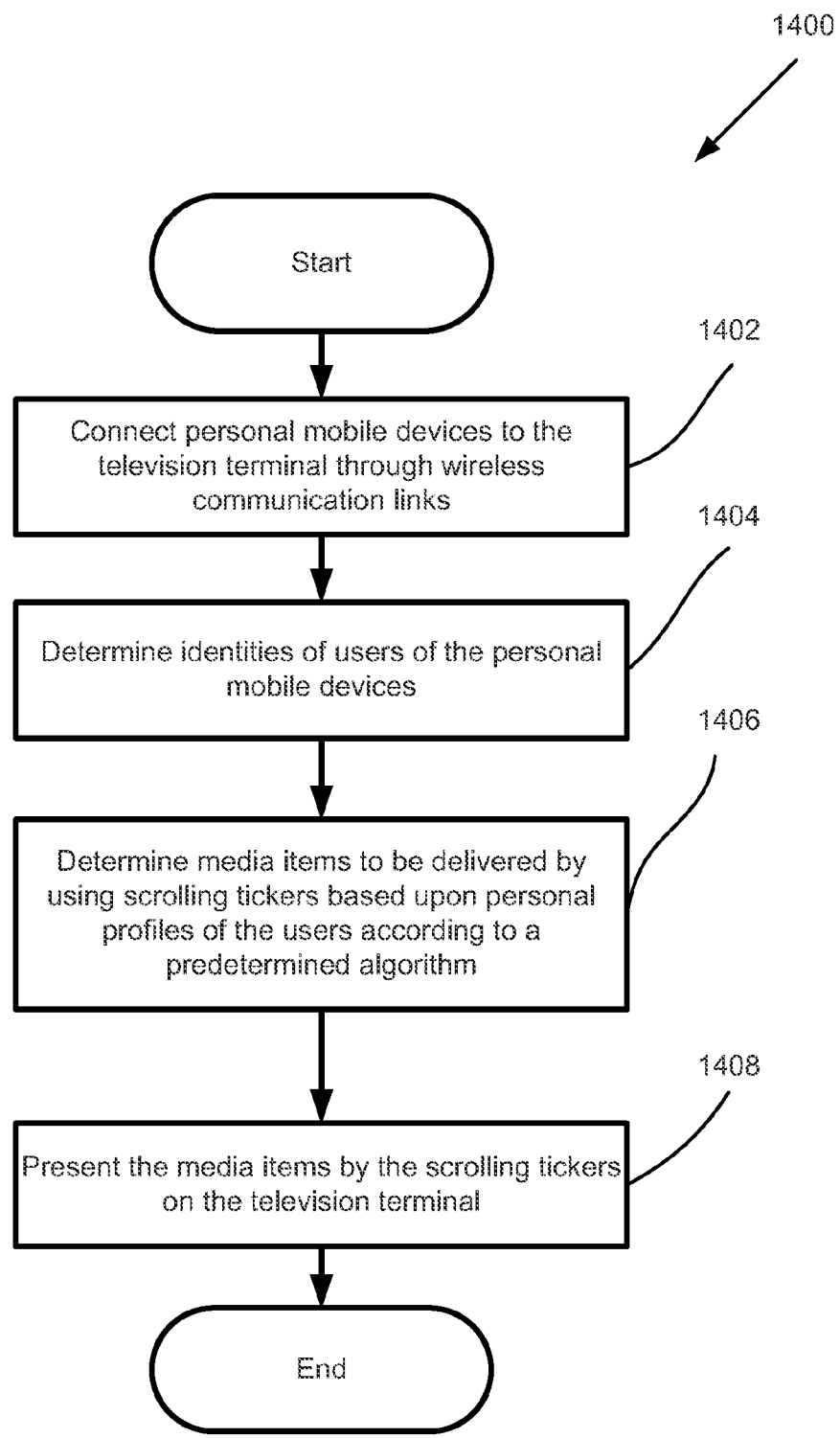
FIG. 14 is a flowchart illustrating an exemplary process that media items are delivered to multiple identified users using scrolling tickers on the television terminal.
Figure 15:
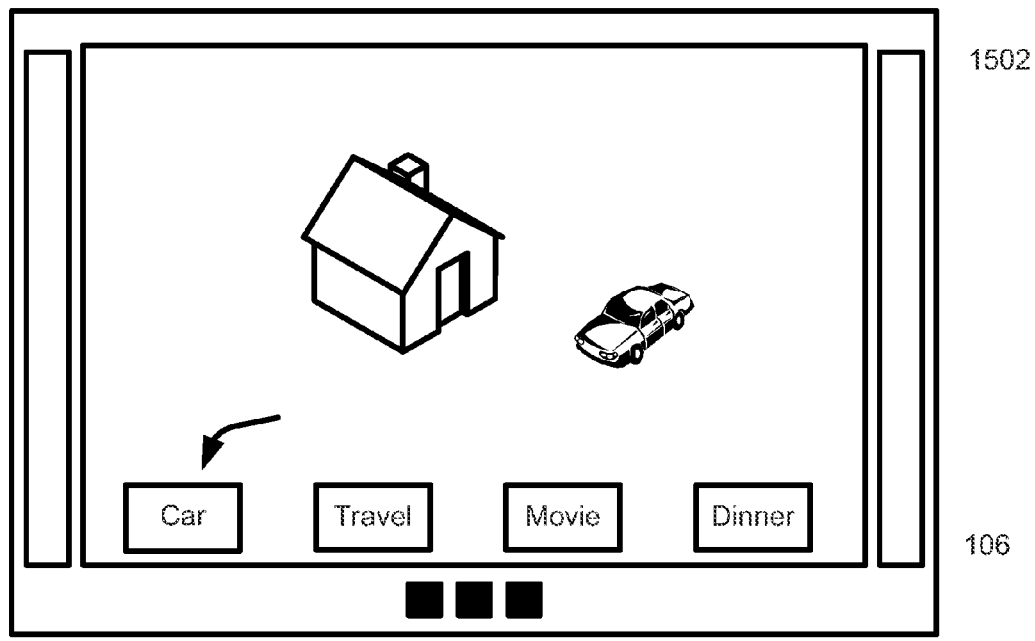
FIG. 15 is a schematic diagram illustrating exemplarily that a user may select one of the personal mobile devices wirelessly connected to the IPTV system to deliver the detailed content of a selected media item.
Figure 15:
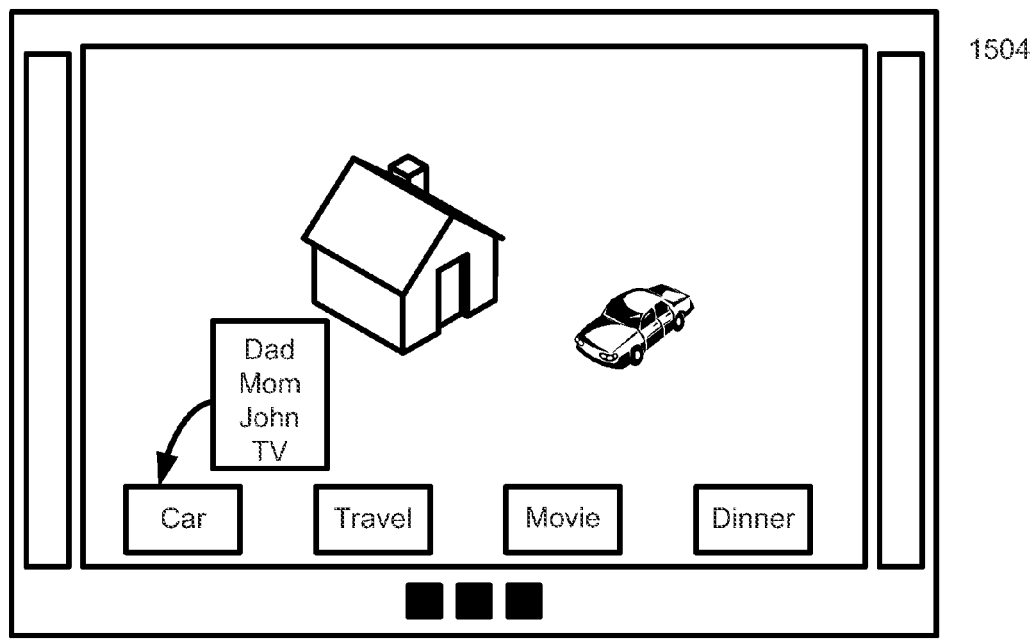

FIG. 14 is a flowchart illustrating an exemplary process that media items are delivered to multiple users using scrolling tickers displayed on television terminal 202 of the IPTV system. Process 1400 starts with step 1402 that personal mobile devices (212A-C) are connected to computing device 206 through wireless communication links (216A-C). The links may be ad hoc links. In an exemplary case, they are Bluetooth type of links. In step 1404, identities of the users of the personal devices are sent to computing device 206 through the communication links. Media items are selected in step 1406 in accordance with the identities of the users. The media items may be selected based upon a predetermined algorithm. In one implementation, common media categories that are interested in to all the users are selected based on the personal profiles of the users. In another implementation, media items are selected based upon the personal profile of each of the users and are combined. The combined media items are displayed sequentially on television terminal using the scrolling ticker. Media items may also be selected using an algorithm that selects the media items based upon a predetermined weight for each of the users According to another embodiment of the present invention, detailed media content may be delivered using a display of the personal mobile device. As shown in FIG. 15, upon a selection of a scrolling ticker by a user in 1502, a window is displayed on the television terminal in 1504 showing a list of user selectable devices. The user may use remote control device 204 or anyone of the personal devices to select a device that the detailed content of the selected media item to be delivered. Upon the selection is made, the detailed content of media item may be delivered using the display of the selected personal mobile device. In another implementation, the remote control device 204 with a display screen may also be selected to deliver the media item.

Figure 16:
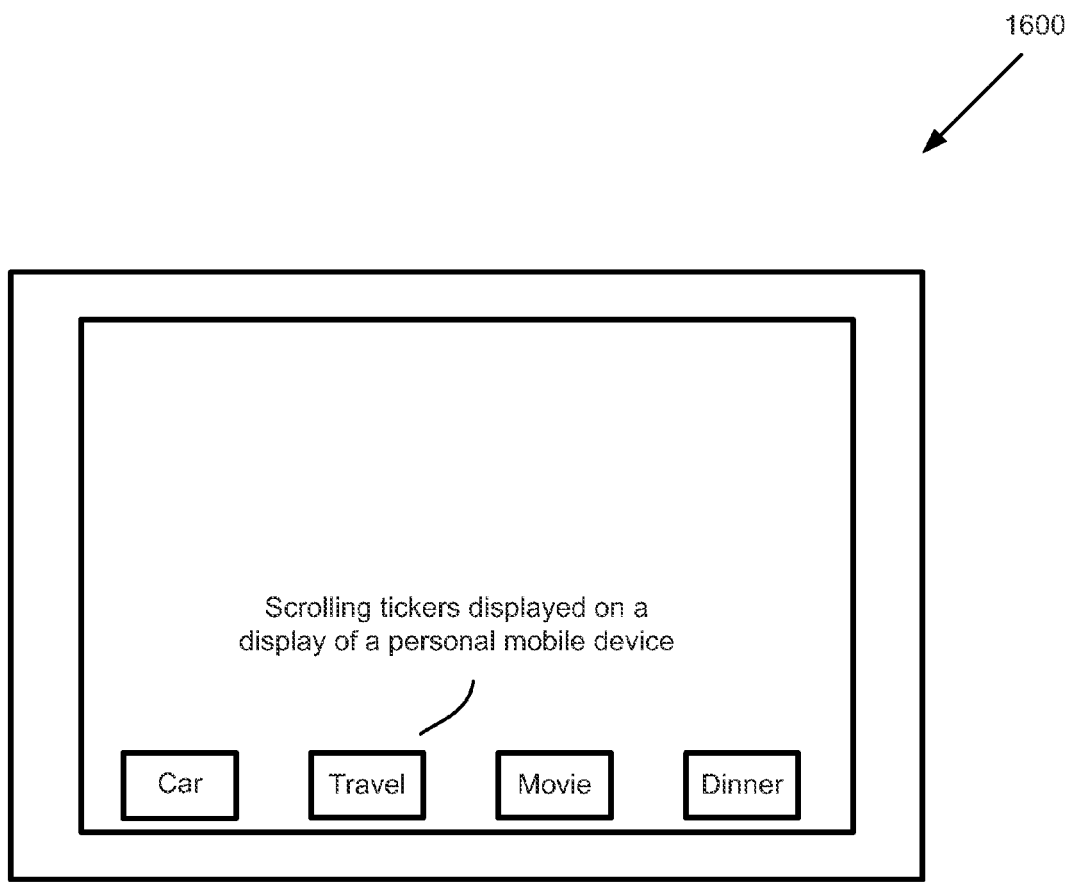
FIG. 16 is a schematic diagram illustrating exemplarily that media items may be displayed on a display screen of a wirelessly connected personal mobile device in a form of scrolling tickers.

According to another embodiment (1600) of the present invention as shown in FIG. 16, scrolling tickers may be displayed concurrently on one or more displays of the personal mobile devices. Anyone of the users may select one of the scrolling tickers using an input device of the personal mobile device. Upon the selection, the detailed content of the media item will be delivered on the display of the personal device. In one implementation, the display of the personal device may be a touch-sensitive type of display. The user may use his or her finger to make the selection. At least, a part of selected media items such as, for example, metadata of the media items will be transmitted from the computing device 206 to the personal mobile devices. After the media item is selected by the user, detailed content of the media item is transmitted from computing device 206 to the personal device. The received detailed content is delivered accordingly.

While the invention has been disclosed with respect to a limited number of embodiments, numerous modifications and variations will be appreciated by those skilled in the art.

The IPTV system is employed exemplarily to illustrate the inventive concept. The inventive concept can be readily applied to any video delivery system for the one skilled in the art. The computing device may be a separate device connected to the television terminal. The computing device may also be an integrated part of the television terminal The computing device may be connected to the network through a cable type of connection. The computing device may also be connected to the network through a wireless broadband connection.

Media items may be transferred from a server connected to the network to the computing device. Media items may also be transferred from the personal mobile devices to the computing devices. Some stored media items may be removed and some new media items may be added to the computing device. In some embodiments, at least a part of media items may not be stored in the computing device but be stored in one or multiple servers in a network or be stored in the "cloud". The media items that are stored in the cloud can also be accessed by the user's selection of one of the scrolling tickers. The network may be the Internet. The network may also be a private communication network.

The media item selected to be displayed by scrolling tickers may be also be related to the television program being broadcasted. The media item may also be related to a history of TV programs or media items that the identified user consumed within a predetermined period of time. The media items may also be related to the location of the interactive television system. The media items may be related to local merchants.

If the media items displayed on the television terminal by the scrolling tickers are advertisements. The user of the interactive television system may receive a credit for selecting and viewing the advertisements. The credit may be used as a discount for purchasing the advertised products or services or be used to discount subscription fee of the interactive television service.

It is intended that all such variations and modifications fall within the scope of the following claims:

The invention claimed is:

1. A method of rendering a media item to a plurality of users of an interactive television system comprising a television terminal, a remote control device and a computing device, the method comprising:
   a. establishing communication links between a plurality of personal mobile devices and the computing device, wherein each of the personal mobile devices is associated with one of the users;
   b. transmitting identities of the users from the personal mobile devices to the computing device through the communication links;
   c. selecting by the computing device a plurality of media items in accordance with the identities of the users from a plurality of stored media items in the computing device in accordance with a predetermined weight for each of the users;
   d. displaying on a predetermined position of the television terminal a plurality of scrolling tickers, wherein said scrolling tickers are representations of selected media items;
   e. selecting one of the displayed scrolling tickers by one of the users employing the remote control device;
   f. displaying on the television terminal representations of said connected personal mobile devices;
   g. selecting one of said personal mobile devices by the user through the remote control device; and
   h. transmitting at least one media item associated with the selected scrolling ticker from the computing device to the personal mobile device.

2. The method as recited in claim 1, wherein said method further comprises rendering the received media item to the user employing the personal mobile device.

3. The method as recited in claim 2, wherein said media item further comprises an advertisement.

4. The method as recited in claim 2, wherein said media item further comprises a video program.

5. The method as recited in claim 1, wherein said step of selecting media items is in accordance further with common categories which are interests to the users.

6. The method as recited in claim 1, wherein said media items may be organized in a hierarchical manner by media categories, wherein said media categories may be displayed by using the scrolling tickers in a hierarchical manner.

7. The method as recited in claim 1, wherein said communication links further comprise ad hoc communication links.

8. The method as recited in claim 7, wherein said ad hoc communication links further comprise a Bluetooth type of connection; or a Wi-Fi type of connection; or a ZigBee type of connection; or an optical type of connection.

9. The method as recited in claim 1, wherein said television system further comprises an image capturing system for identifying the users.

10. The method as recited in claim 1, wherein at least a portion of the media items are stored in one or a plurality of servers connected to the computing device through a communication network.

11. A method of rendering a media item to a plurality of users of an interactive television system comprising a television terminal, a remote control device and a computing device, the method comprising:
  a. establishing communication links between a plurality of personal mobile devices and the computing device, wherein each of the personal mobile devices is associated with one of the users;
  b. transmitting identities of the users from the personal mobile devices to the computing device through the communication links;
  c. selecting by the computing device a plurality of media items in accordance with the identities of the users from a plurality of stored media items in the computing device in accordance with a predetermined weight for each of the users;
  d. displaying on the television terminal representations of said connected personal mobile devices;
  e. selecting one of said personal mobile devices by one of the users through the remote control device;
  f. transmitting metadata of selected media items to the personal mobile device through the communication links;
  g. displaying on predetermined positions of the personal mobile devices a plurality of scrolling tickers, wherein said scrolling tickers are representations of selected media items;
  h. selecting one of the displayed scrolling tickers by the user employing the personal mobile device; and
  i. transmitting the media item associated with selected scrolling ticker from the computing device to the personal mobile device.

12. The method as recited in claim 11, wherein said method further comprises rendering the received media item to the user employing the personal mobile device.

13. The method as recited in claim 12, wherein said media item further comprises an advertisement.

14. The method as recited in claim 12, wherein said media item further comprises a video program.

15. The method as recited in claim 11, wherein said step of selecting media items is in accordance further with common categories which are interests to the users.

16. The method as recited in claim 11, wherein said media items may be organized in a hierarchical manner by media categories, wherein said media categories may be displayed by using the scrolling tickers in a hierarchical manner.

17. The method as recited in claim 11, wherein said communication links further comprise ad hoc communication links.

18. The method as recited in claim 17, wherein said ad hoc communication links further comprise a Bluetooth type of connection; or a Wi-Fi type of connection; or a ZigBee type of connection; or an optical type of connection.

19. The method as recited in claim 11, wherein said television system further comprises an image capturing system for identifying the users.

20. A method of rendering a media item to a plurality of users of an interactive television system comprising a television terminal, a remote control device and a computing device, the method comprising:
  a. establishing communication links between a plurality of personal mobile devices and the computing device, wherein each of the personal mobile devices is associated with one of the users;
  b. determining identities of the users by employing an image capturing system of the interactive television system;
  c. selecting by the computing device a plurality of media items in accordance with the identities of the users from a plurality of stored media items in the computing device in accordance with a predetermined weight for each of the users;
  d. displaying on a predetermined position of the television terminal a plurality of scrolling tickers, wherein said scrolling tickers are representations of selected media items;
  e. selecting one of the displayed scrolling tickers by one of the users employing the remote control device;
  f. displaying on the television terminal representations of said connected personal mobile device;
  g. selecting one of said personal mobile devices by the user through the remote control device; and
  h. transmitting at least one media item associated with the selected scrolling ticker from the computing device to the personal mobile device.

* * * * *